(12) United States Patent
Cerqueira et al.

(10) Patent No.: US 10,365,876 B2
(45) Date of Patent: Jul. 30, 2019

(54) AUTOMATIC REAL-TIME CONFIGURATION OF A MULTI-HEAD DISPLAY SYSTEM

(71) Applicant: International Business Machines Corporation, Armonk, NY (US)

(72) Inventors: Renato Fontoura de Gusmao Cerqueira, Barra da Tijuca (BR); Marcio Ferreira Moreno, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 15/490,995

(22) Filed: Apr. 19, 2017

(65) Prior Publication Data
US 2018/0307454 A1   Oct. 25, 2018

(51) Int. Cl.
| | |
|---|---|
| G06F 3/14 | (2006.01) |
| G06T 11/60 | (2006.01) |
| G06T 3/60 | (2006.01) |
| G06N 20/00 | (2019.01) |
| H04N 7/14 | (2006.01) |
| H04N 13/327 | (2018.01) |
| G09G 5/00 | (2006.01) |

(52) U.S. Cl.
CPC .......... *G06F 3/1423* (2013.01); *G06F 3/1446* (2013.01); *G06F 3/1454* (2013.01); *G06N 20/00* (2019.01); *G06T 11/60* (2013.01); *G09G 5/00* (2013.01); *H04N 7/142* (2013.01); *H04N 13/327* (2018.05); *G06T 2210/22* (2013.01); *G09G 2320/0693* (2013.01); *G09G 2320/08* (2013.01); *G09G 2340/0407* (2013.01); *G09G 2340/0492* (2013.01); *G09G 2356/00* (2013.01); *G09G 2370/042* (2013.01)

(58) Field of Classification Search
CPC .. H04N 7/142; H04N 13/327; G09G 2356/00; G09G 2320/0693; G09G 2320/08; G09G 2340/0407; G09G 9/3026; G06F 3/1446; G09F 9/3026
USPC ................................................... 345/629, 1.3
See application file for complete search history.

(56) References Cited

U.S. PATENT DOCUMENTS

| | | |
|---|---|---|
| 6,404,456 B1 | 6/2002 | Smith |
| 7,554,510 B1 | 6/2009 | Grigor et al. |
| | (Continued) | |

OTHER PUBLICATIONS

Peter Mell, "The NIST Definition of Cloud Computing". Special Publication 800-145. Sep. 2011, pp. 1-7.

(Continued)

*Primary Examiner* — Jin Cheng Wang
(74) *Attorney, Agent, or Firm* — Grant Johnson; Otterstedt, Wallace & Kammer, LLP

(57) ABSTRACT

A computer-implemented method includes a step of generating a clipped image by applying a display map to a feedback image of a plurality of display devices that display a set of training frames. The method also includes a step of learning a first set of rules that transform the clipped image to match the set of training frames and a step of generating a rendered surface by applying the display map to an input image. Additionally, the method includes a step of generating a set of render frames by applying the first set of rules to the rendered surface and a step of sending the set of render frames to be displayed by the plurality of display devices.

13 Claims, 10 Drawing Sheets

(56) References Cited

U.S. PATENT DOCUMENTS

| | | | |
|---|---|---|---|
| 9,118,888 B1* | 8/2015 | Hundemer | H04N 5/93 |
| 2003/0214458 A1 | 11/2003 | Giemborek et al. | |
| 2004/0080482 A1* | 4/2004 | Magendanz | G06F 3/1431 |
| | | | 345/100 |
| 2010/0328447 A1* | 12/2010 | Watson | G06F 3/1446 |
| | | | 348/135 |
| 2012/0013523 A1* | 1/2012 | Jaynes | G06T 11/60 |
| | | | 345/1.3 |
| 2013/0147860 A1* | 6/2013 | Ishida | G09G 5/10 |
| | | | 345/690 |
| 2014/0293017 A1* | 10/2014 | Fei | G09F 9/3026 |
| | | | 348/51 |
| 2015/0279037 A1* | 10/2015 | Griffin | G06F 3/1446 |
| | | | 345/1.3 |
| 2017/0230611 A1* | 8/2017 | Hundemer | H04N 5/9305 |

OTHER PUBLICATIONS

John E Kelly III, "Computing, cognition, and the future of knowing", IBM Corp. Oct. 2015, pp. 1-7.

Koutarou Ogawa et al., "Development of a Video Wall Display System Using Ultrathin-Bezel LCD Panels", NEC Techn. J. Oct. 2011. v. 6:3, pp. 84-88.

Byeong Jeong Kim et al., "A Decentralized Approach to Geometric Video Correction for Network-based Video Wall", Intl. J. of u- and e-Service, Science, and Techn. Aug. 2015. v. 8:8, pp. 243-252.

Marcio Ferreira Moreno et al. "Support to Multimedia Presentations on Multi-Head Setups", Proc. IEEE Intl. Symp. on Multimedia. Dec. 2015. pp. 381-384.

Tomas Jakab, "Geometry and Transformations in Deep Convolutional Neural Networks", Bachelor's project, Czech Techn. Univ. in Prague. May 2016, pp. 1-55.

Renato Fontoura de Gusmao Cerqueira et al., unpublished U.S. Appl. No. 15/859,577, filed Dec. 31, 2017, Automatic Real-Time Configuration of a Multi-Head Display System, pp. 1-28 plus 11 sheets of drawings.

Paul J. Otterstedt, List of IBM Patents or Patent Applications Treated as Related, Jun. 27, 2018, pp. 1-2.

* cited by examiner

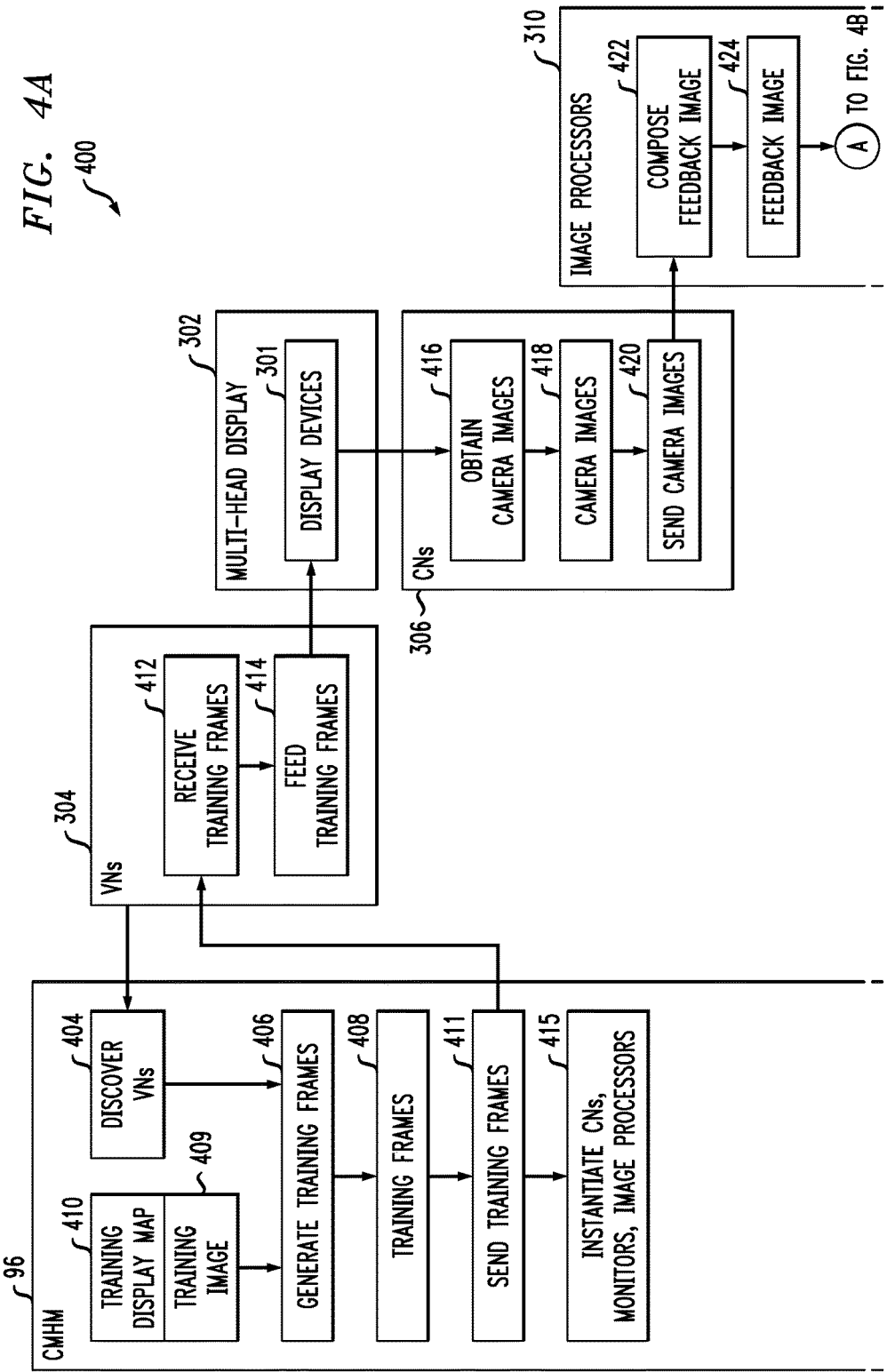

AUTOMATIC REAL-TIME CONFIGURATION OF A MULTI-HEAD DISPLAY SYSTEM

BACKGROUND

The present invention relates to the electrical, electronic, and computer arts, and more specifically, to multi-head displays A multi-head display setup (or multi-head displays) is a set defined by two or more display devices (e.g., monitors, screens, TVs, smart phones, tablets, notebook displays, projectors, etc.). Multi-head displays are commonly used to enhance productivity and to increase the screen area of multimedia presentations. Extending the exhibition area by connecting a monitor to a computer, video walls, public displays, digital signage, and similar sets of exhibition areas are common applications of multi-head displays. In a multi-head display setup, content can be shown in one or multiple display devices, spanning through screens that can act as one bigger screen. The configuration of each display device in a multi-head display setup is a delicate and difficult task that enhances the quality of experience of users by providing presentation uniformity and space representation (for instance dragging visual content off the left side of a first display device should mean that the visual content appears on a second display device that is physically disposed to the left of the first display).

SUMMARY

Principles of the invention provide techniques for automatic real-time configuration of a multi-head display system.

In one aspect, an exemplary computer-implemented method, according to an aspect of the invention, includes a step of generating a clipped image by applying a display map to a feedback image of a plurality of display devices that display a set of training frames. The exemplary method also includes a step of learning a first set of rules that transform the clipped image to match the set of training frames and a step of generating a rendered surface by applying the display map to an input image. Additionally, the exemplary method includes a step of generating a set of render frames by applying the first set of rules to the rendered surface and a step of sending the set of render frames to be displayed by the plurality of display devices.

In another aspect of the invention, a non-transitory computer readable medium embodies computer executable instructions, which when executed by a computer cause the computer to facilitate the method above discussed.

In yet another aspect, the invention provides an apparatus that includes a memory embodying computer executable instructions and at least one processor, coupled to the memory, and operative by the computer executable instructions to facilitate the method above discussed.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

Automatically setting information about which displays are part of the multi-head set, the display arrangement (e.g., map of displays, orientation, etc.), display properties (e.g., brightness, hue, intensity, contrast, color temperature, etc.), bezels and gaps between displays, and any geometric distortion that should be applied while rendering content in the multi-head set.

Automatically adjusting in real-time to changes in the multi-head arrangement (e.g., change a display orientation or position, etc.).

Thus, embodiments of the invention provide for continuously capturing and processing images using one or multiple capture devices to automatically fetch parameters of the physical characteristics of a multi-head display, and for automatically calibrating the multi-head display in real-time, thereby easing the initial configuration of the multi-head display and improving quality of experience during multimedia presentations. The invention discovers all display devices involved and uses a cognitive system to configure each device's characteristics, calculating the multi-head display information such as total resolution, surface curvature, overlapped areas, relative coordinates, the active exhibition area, etc. The disclosed invention also calibrates and checks in real-time the occurrence of changes in the devices of the discovered multi-head display. In this case, all changes are automatically reflected on the logic configuration (for instance: if a user moves a display from one place to another; if a user changes the orientation of one or multiple displays from horizontal to vertical; etc.). Additionally, aspects of the invention also provide for automatically adapting the multi-head display to account for adding and removing display devices.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 4A-4B illustrate a method of discovery implemented by the multi-head display system of FIG. 3, according to an embodiment of the invention;

DETAILED DESCRIPTION

Figure 1:
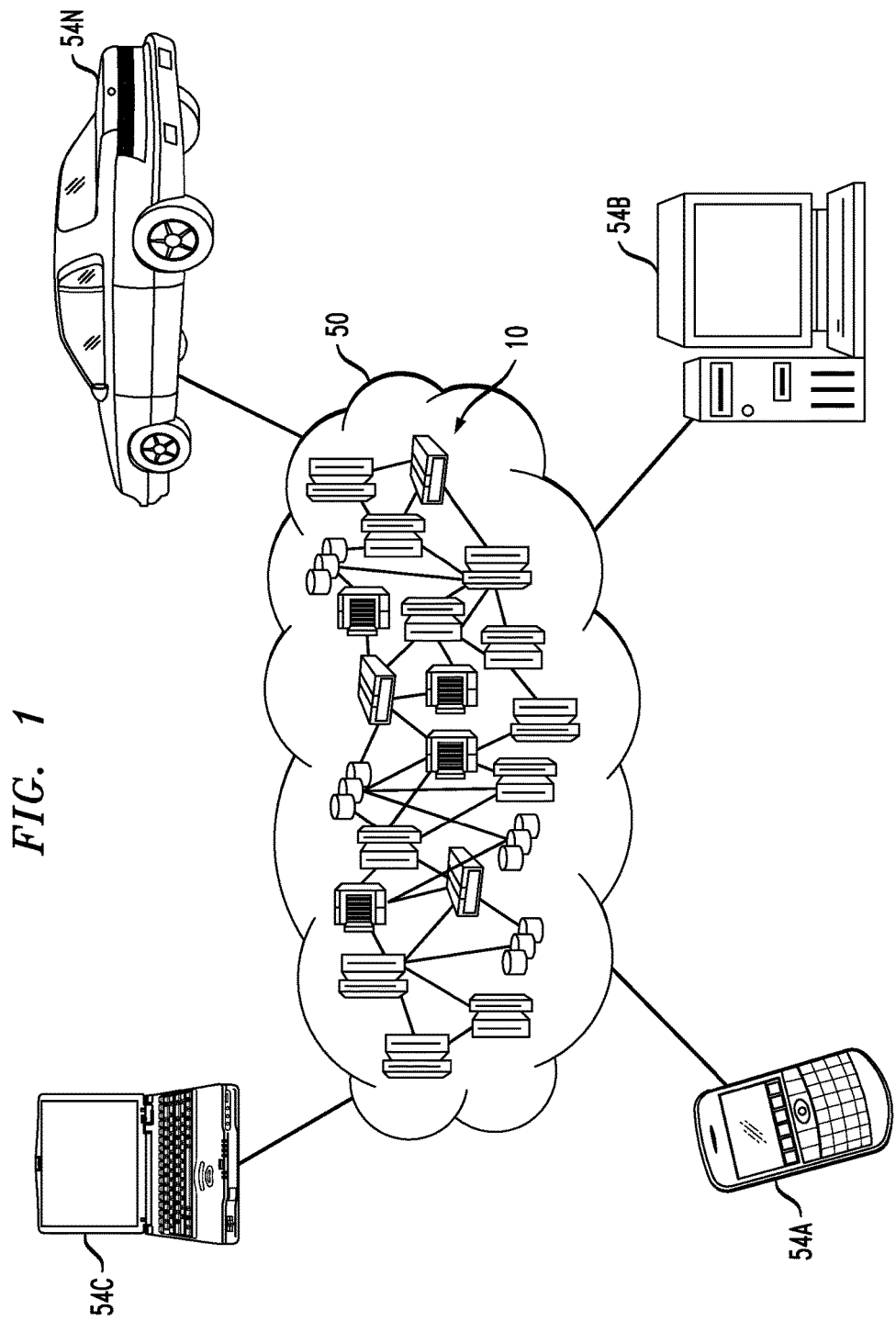
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54B, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
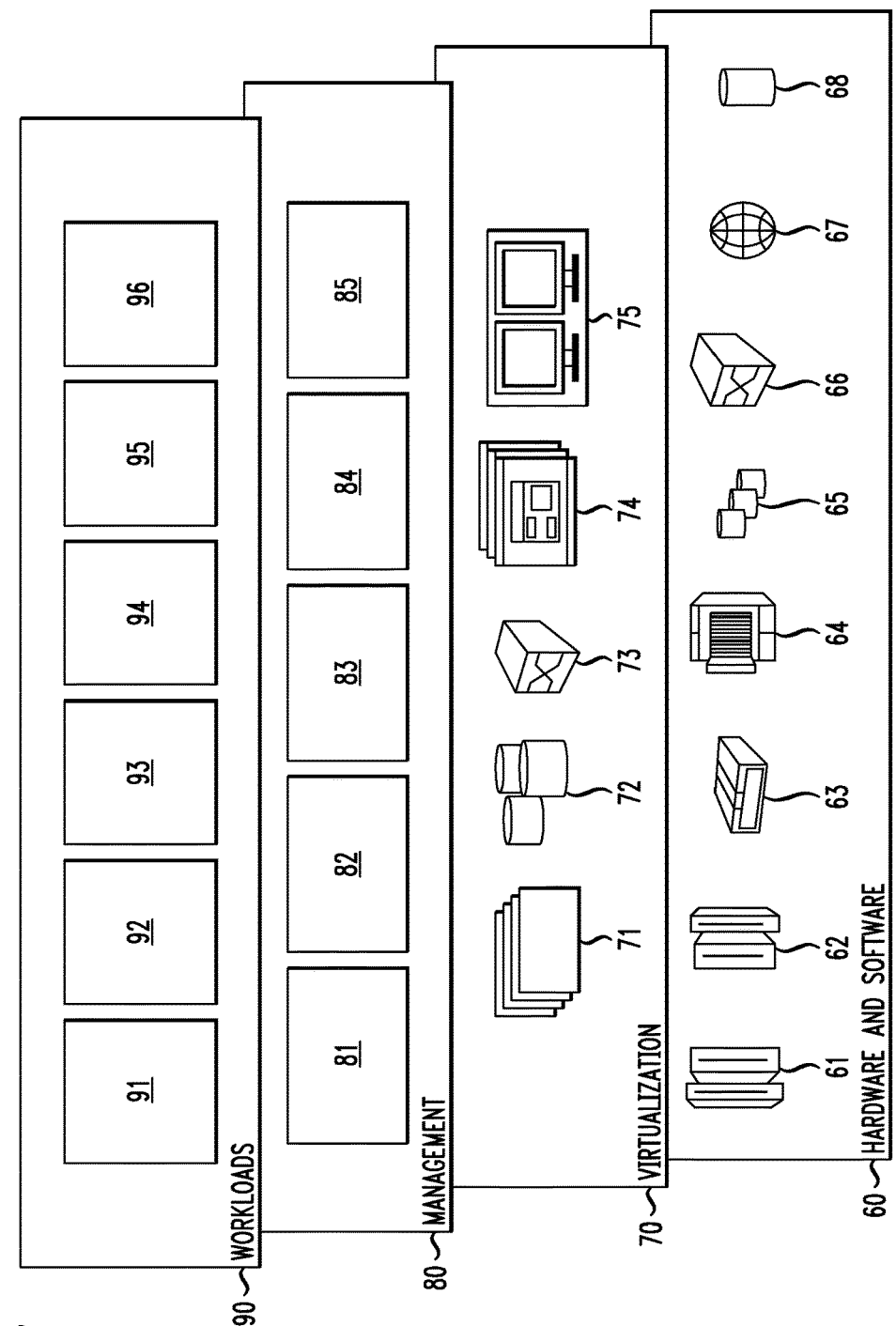
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cognitive multi-head manager (CMHM) 96.

Figure 3:
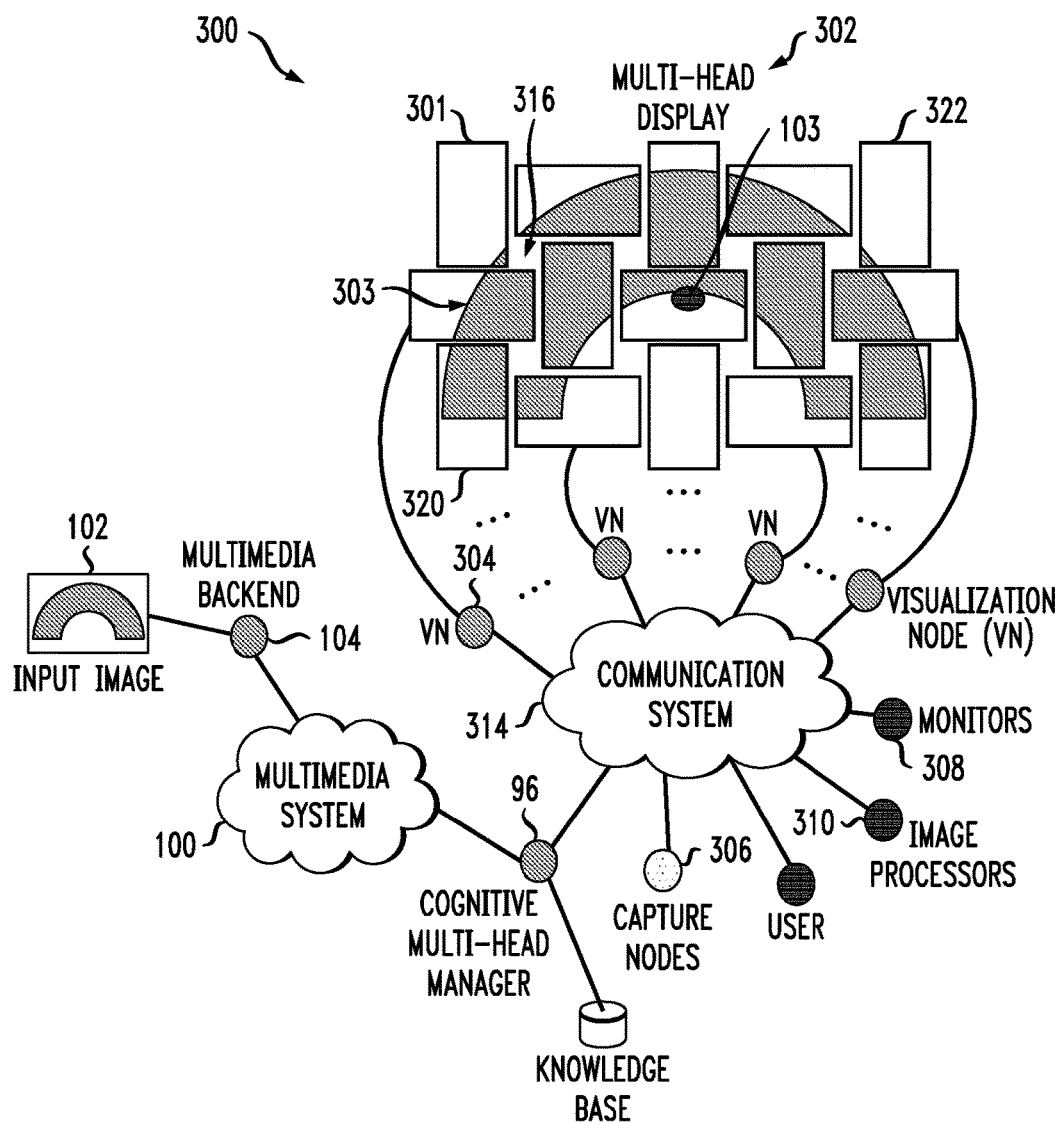
FIG. 3 illustrates a multimedia system and an associated multi-head display system, according to an embodiment of the invention.

Referring to FIG. 3, the present invention focuses on automatic real-time configuration of a multi-head display system 300. One or more embodiments of the invention enable the discovery of display devices 301, their arrangement calibration, and improving their operation within a multi-head display 302. A multi-head display 302 is a set defined by two or more display devices 301. Video walls, light walls, public displays, digital signage, and similar sets of exhibition areas are applications of multi-head displays. In a multi-head display, content can be shown in multiple display devices 301, spanning through screens that can act as one or more bigger screens according to the number of sets of display devices. The arrangement calibration of each display device 301 within the multi-head display 302 enhances the quality of experience of users, providing presentation uniformity. The display devices 301 can include, for example, televisions, computer monitors, projected images, mobile phone screens, tablet computers. Each of the display devices 301 can be characterized by parameters including its height, width, angular orientation, pixel resolution, and bezel edge width(s). The display devices 301 are further characterized by their center locations relative to an image center 103.

Still referring to FIG. 3, in an exemplary embodiment of the invention a multimedia system 100 receives an input image 102 through its multimedia backend 104, and feeds the input image 102 to a multi-head display system 300. (The input image 102 is an image to be presented by the multi-head display system 300). The multi-head display system 300 has as its main entity the CMHM 96. The system 300 also includes the display devices 301 that compose a multi-head display 302, visualization nodes (VN) 304, capture nodes (CN) 306, monitors 308, and image processors 310. The components of the system 300 are connected by a communication system 314. In one or more embodiments, the communication system 314 is wireless. In other embodiments, the communication system 314 is partially or entirely wired. For example, the communication system 314 includes one or more of several types of local area network (LAN) or wide area network (WAN) protocol and equipment, e.g., Ethernet, Token Ring, WiFi (a registered trademark of the Wi-Fi Alliance), or Bluetooth (a registered trademark of Bluetooth SIG).

The CMHM 96 receives the input image 102 from the multimedia system 100, generates image frames from the input image, and sends the image frames to the VNs 304. The CMHM 96 also discovers each of the display devices 301, based on a feedback image produced by the CNs 306. Display discovery includes estimating the parameters that characterize each of the display devices 301. The CMHM 96 generates a display map of the display devices 301 as arranged in the multi-head display 302. In response to the display map of the multi-head display 302, the CMHM 96 modifies the image frames to provide a rendered surface 303 that matches the input image to the display map, and distributes the modified image frames to the VNs 304.

The CMHM 96 is a neural network that determines in real-time how to modify the image frames that are sent to the VNs 304. For purposes of this disclosure, "real-time" means a small multiple of the refresh period of the slowest VN or of the frame period of the slowest CN, whichever is slower. In one or more embodiments, a "small multiple" is less than 20; in certain embodiments, less than 10; in select embodiments, less than 5. For example, if the slowest VN refreshes at 60 frames per second (fps), the CMHM 96 may adjust the frames at about 12 fps.

Generally, a neural network includes one or more computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning. In supervised or semi-supervised machine learning the neural network is provided with a set of sample input data and sample output data, and adjusts the connections between the simulated neurons until it can produce the sample output data from the sample input data. Then the neural network is provided with a new set of input data to produce a new set of output data. In unsupervised machine learning, the neural network is provided only with input data, and outputs a categorization of the input data in response to patterns that it identifies in the input data.

According to one or more embodiments of the invention, the multi-head display system 300 (and the CMHM 96) has two modes: discovery and operation. When the system 300 starts to run (hardware and software), it enters in discovery mode. Some purposes of discovery mode are to identify and characterize the display(s) 301 that correspond to each VN 304, and to establish a display map and a first set of rules for generating image frames that will be displayed as the rendered surface 303 through the multi-head display 302. The system can execute the discovery mode many times (and not only when it starts to run). For instance, to check if there is a new display in the multi-head display set. This display would be added during operation mode. The system should react in real time. One purpose of operation mode is to monitor for changes to the multi-head display, and to trigger discovery mode in case a change is detected.

When entering discovery mode, the CMHM 96 instantiates its image processors 310 and uses existent discovery technologies (e.g., Universal Plug and Play (UPnP), Simple Service Discovery Protocol (SSDP)) to find and instantiate all (remote and local) VNs 304 and CNs 306. During discovery mode, the CMHM 96 sends unique image frames to each of the VNs 304 as further discussed hereafter. The CMHM 96 also commands its image processors 310 to process images received from the CNs 306.

There are two types of VN 304: local and remote. A VN 304 is considered local when it is located in the same machine as the CMHM 96. It is possible to have multiple local VNs. A remote VN 304 is in a remote machine network connected with the CMHM machine. The discovery process starts by instantiating the CMHM and the remote VNs that will compose the multi-head setup (the local VNs are initialized and controlled by the CMHM instance).

Figure 4B:
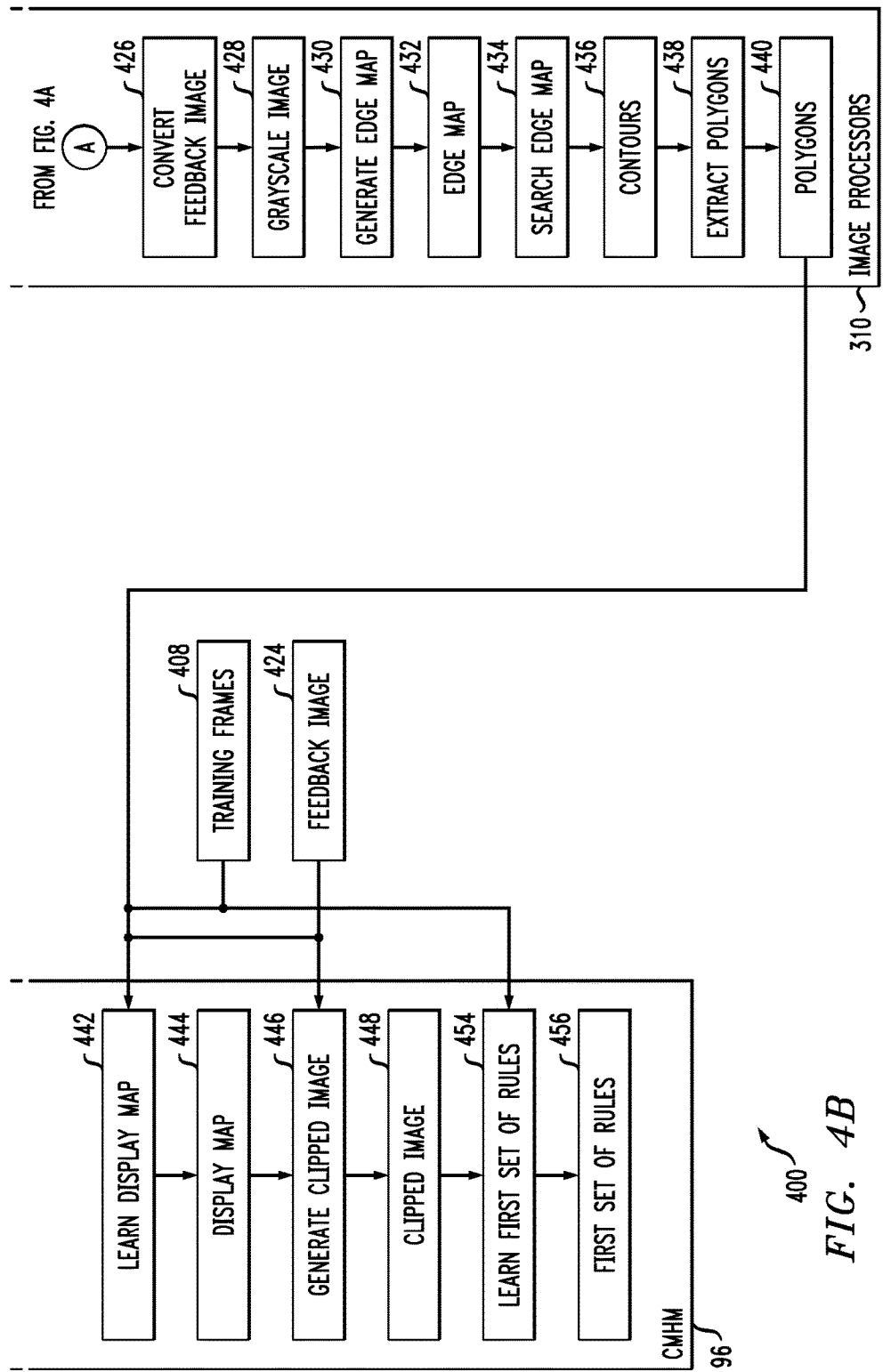

FIGS. 4A-4B illustrate a method of discovery 400 that is implemented by the CMHM 96 for discovering the display map 444 and the first set of rules 456. First, at a step 404 the CMHM 96 discovers the VNs 304, e.g., using SSDP. Then at a step 406 the CMHM 96 generates training frames 408 by equally segmenting a training image 409 according to a training display map 410. In one or more embodiments, the training display map 410 is created without prior knowledge of the multi-head display layout, e.g., representing an arbitrary number of display devices (e.g., equal to the number of discovered VNs 304) in an arbitrary pattern (e.g., a grid pattern) and assigned to the VNs 304 in arbitrary order (e.g., in order of discovery). In one or more embodiments, the training display map 410 is created incorporating user input regarding the multi-head display layout, e.g., approximate relative positions of the display devices 301.

At a step 411 the CMHM 96 sends the training frames 408 to the VNs 304. The VNs 304 perform a step 412 of receiving the training frames 408 from the CMHM 96 and perform a step 414 of feeding the training frames 408 to the display devices 301. Although FIG. 3 shows VNs 304 connected one-to-one with display devices 301, in one or more embodiments a single VN 304 may feed training frames to multiple display devices 301. Thus, each VN 304 feeds its training frame(s) 408 to one or more of the display devices 301 that compose the multi-head display 302.

Still referring to FIGS. 4A-4B, the method of discovery 400 continues at a step 415 of instantiating the other entities (i.e. CNs 306, monitors 308, and image processors 310), which are connected with the CMHM 96 through the communication system 314. The CNs 306 (e.g., cameras, beacons, and other sensors) and monitors 308 (devices that compare previous information with the information fetched from CNs 306) are commanded by the CMHM 96 and are responsible to continuously fetch the multi-head setup information. With this information, the CMHM 96 commands the image processors 310, which are capable to deliver the appropriate information (e.g., using machine learning and image processing algorithms) to CMHM 96, which automatically define the multi-head arrangement configuration. Communication between the CMHM 96 and users enables the system to learn from user curation. In one or more embodiments, the system works without user curation. However, in one or more embodiments, the system advantageously evolves in response to user curation. The user curation is the action that completes a cognitive loop, in which the system exhibits a symbiotic relation with human cognitive systems. While the user augments his or her cognitive capabilities assisted by the cognitive computing system, the system takes advantage of the relation by learning from the user.

Thus, the CNs 306 perform a step 416 of obtaining camera images 418 of the multi-head display 302, and perform a step 420 of sending the camera images 418 to the image processors 310. In other words, one or more CNs (CN) 308 view the display devices 301, capture camera images 418 of the multi-head display 302, and send the camera images 418 to the image processors 310.

The image processors 310 (which may be implemented as software instantiated by and in the CMHM 96) perform a step 422 of composing a feedback image 424 from the camera images 418. Note that one or more embodiments could consider information captured by other devices, such as beacons, easing the processing to discover display positioning map. Next, at a step 426 the image processors 310 convert the feedback image 424 to a grayscale image 428, thereby simplifying its forms. Then at a step 430 the image processors 310 generate an edge map 432 of edges in the grayscale image 428. In one or more embodiments, the image processors 310 use the Canny algorithm to perform the step 430. Then the image processors 310 perform a step 434 of searching the edge map 432 for contours 436 (closed edges). In one or more embodiments, the CMHM 96 uses the Suzuki algorithm to perform the step 434. At a step 438 the image processors 310 extract from the contours 436 a set of convex polygons 440. In one or more embodiments the image processors 310 uses the Douglas-Peucker algorithm to perform the step 438. In one or more embodiments the image processors 310 extracts only those polygons 440 that have four vertices.

In one or more embodiments, multiple unrelated polygons are found. Accordingly, the CMHM 96 performs a step 442 of learning a display map 444 from the training frames 408, the feedback image 424, and the set of polygons 440. In the step 442, the CMHM 96 uses the training frames 408 that were sent by the CMHM 96 to the VNs 304 not only to identify one or more polygons 440 that correspond to each of the VNs 304, but also to univocally validate whether each of the polygons 440 does correspond to one of the VNs 304.

In one or more embodiments, the CMHM 96 accomplishes the step 442 by unsupervised learning.

Once the CMHM 96 has generated the display map 444, it proceeds to a step 446 of generating a clipped image 448 that includes only those parts of the feedback image 424 that intersect the display map 444.

The CMHM 96 then proceeds to a step 454 of learning a first set of rules 456 that transform the clipped image 448 to match the training frames 408. The first set of rules 456 characterize the display devices 301 and the multi-head display 302. In particular, the first set of rules 456 incorporate inferred knowledge of the parameters characterizing the display devices 301, based on comparison of the clipped image 448 to the training frames 408. In one or more embodiments, the CMHM 96 uses supervised learning to learn the first set of rules, with the clipped image 448 as the input data set and the training frames 408 as the output data set.

According to one or more embodiments of the invention, the CMHM 96 is a cognitive computing system that learns from user feedback and curation. Cognitive computing systems are AI systems, but with a different approach: the system interacts with the user in a more natural way. Cognitive computing systems have a symbiotic relation with human cognitive systems. While the user augments his cognitive capabilities assisted by the cognitive computing system, the system takes advantage of the relation by learning with the user.

Figure 5A:
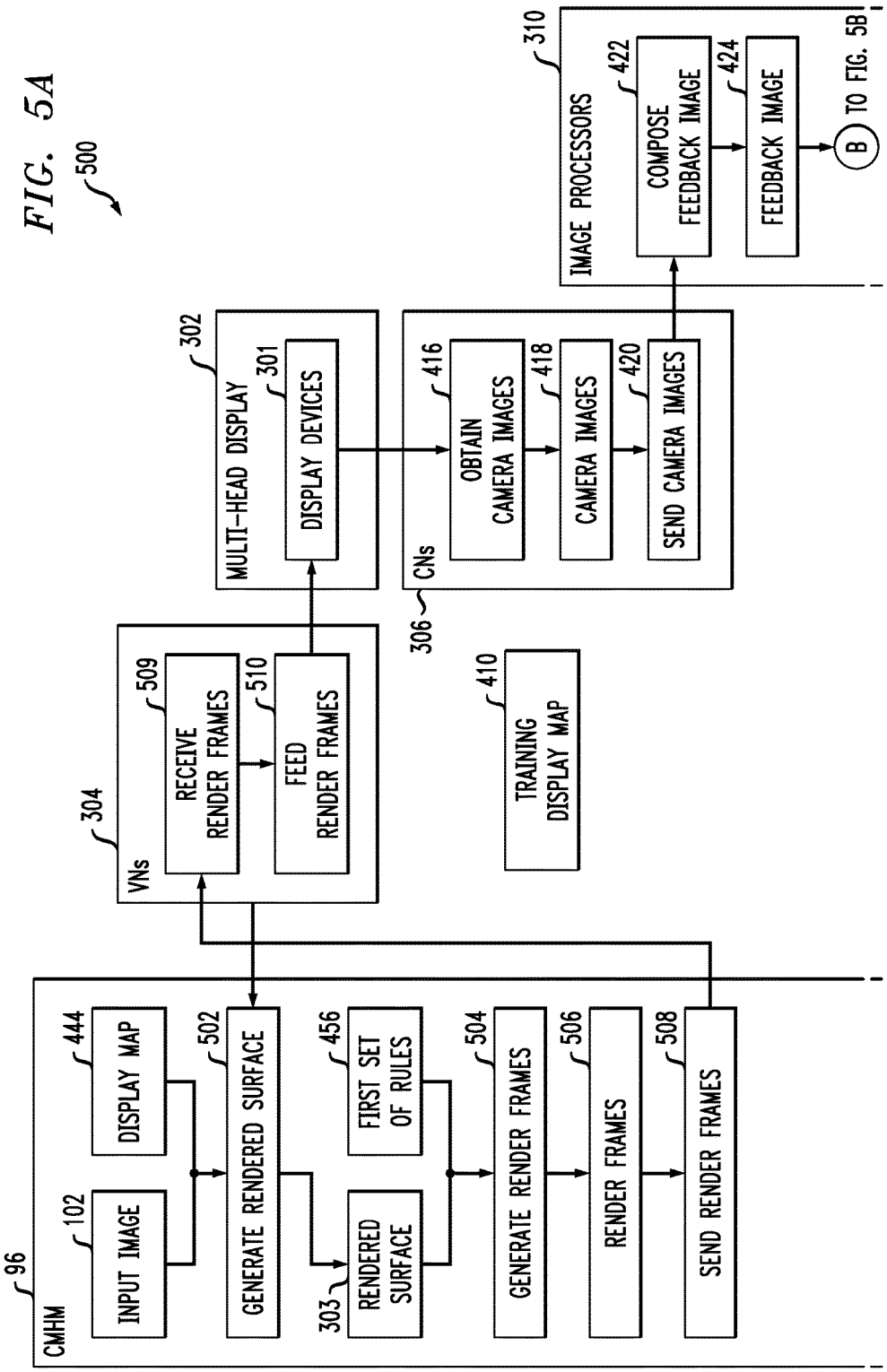
FIGS. 5A-5B depict a method of operation implemented by the multi-head display system of FIG. 3, according to an embodiment of the invention.
Figure 5B:
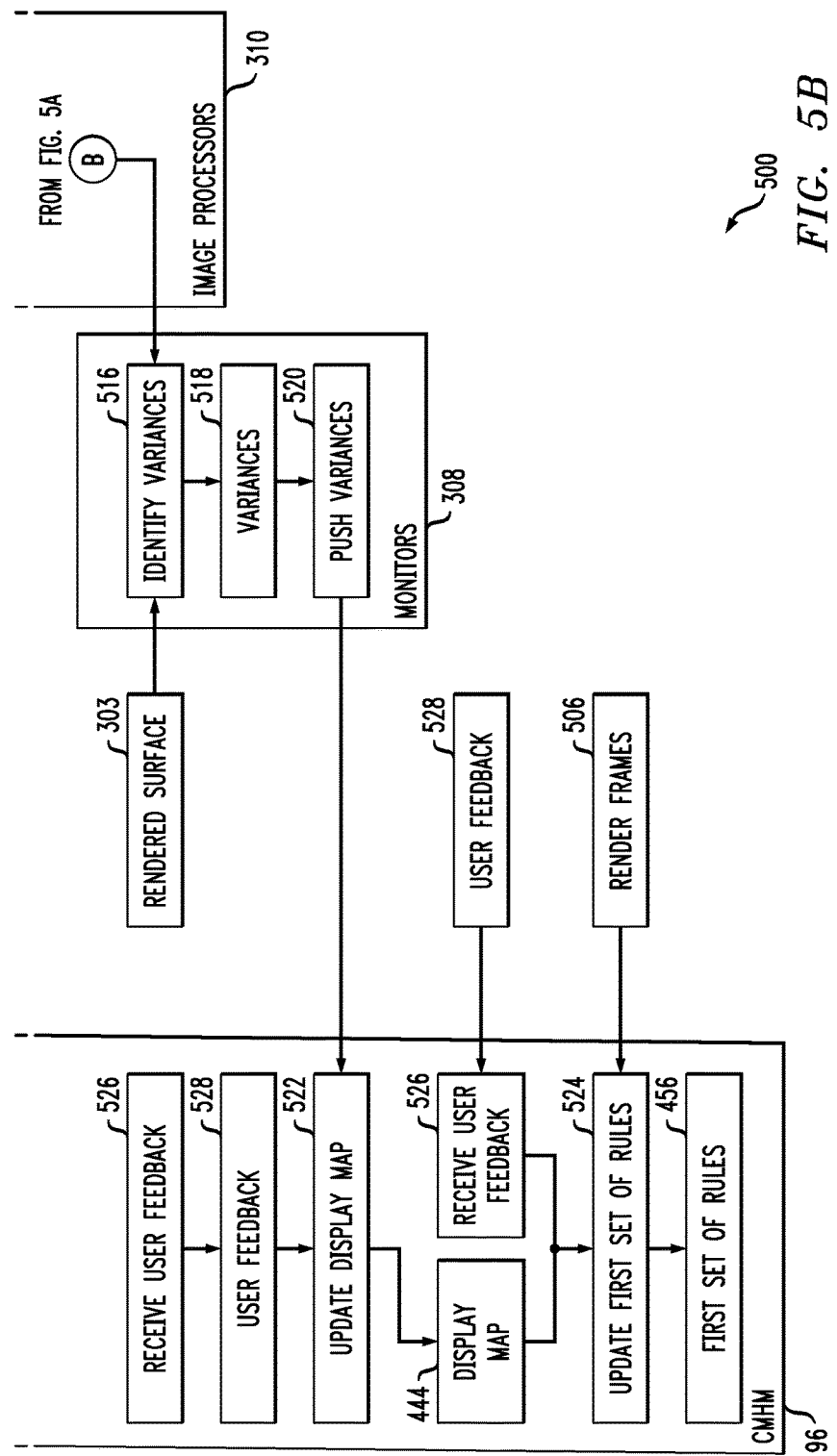

Once the CMHM 96 has learned the first set of rules 456, the multi-head display system 300 then begins to perform a method of operation 500, as shown in FIGS. 5A-5B, for displaying the rendered surface 303 at the multi-head display 302 based on the input image 102, the display map 444, and the first set of rules 456. In the method of operation 500, the CMHM 96 controls the multimedia system 100 to obtain images from multimedia system 100, process the obtained images and then generate the rendered surface 303. In one or more embodiments, the method of operation 500 also includes updating the first set of rules responsive to variances of the multi-head display 302 from the display map 444, for example due to displacement or malfunction of one or more display devices 301.

FIGS. 5A-5B depict steps of the method of operation 500. According to the method of operation 500, the CMHM 96 performs a step 502 of generating the rendered surface 303 by intersecting the input image 102 with the display map 444. Thus, rendering of the rendering surface is performed by the CMHM 96, using the display map 444, in response to the input image 102 that is supplied by the multimedia system 100. For example, if a video content should be presented in a video wall at a rate of 60 fps, the CMHM 96 generates the rendered surface 303 sixty times per second.

The CMHM 96 then performs a step 504 of generating a set of render frames 506 by applying the first set of rules 456 to the rendered surface 303, and performs a step 508 of sending the render frames 506 to the VNs 304. The VNs 304 perform a step 509 of receiving the render frames 506 and perform a step 510 of feeding the render frames 506 to the display devices 301 to display the rendered surface 303.

Each time the CMHM 96 sends the render frames 506 to the VNs 304, the CNs 306 perform the step 416 of obtaining camera images 418 and the step 420 of sending the camera images to the image processors 310, which perform the step 422 of composing the feedback image 424. In one or more embodiments, the CNs 306 also acquire other sensor information, such as beacon position information. At a step 516 the monitors 308 receive the feedback image 424 (and optionally, other sensor information) from the image processors 310 (or directly from the CNs 306) and identify any variances 518 between the rendered surface 303 and the feedback image 424. At a step 520 the monitors 308 push the variances 518 to the CMHM 96.

In response to identifying the variances 518, the CMHM 96 performs a step 522 of updating the display map 444, and a step 524 of updating the first set of rules 456. Using the updated display map 444 and the updated rules 456, the CMHM 96 then performs step 502 again. In one or more embodiments, the method 500 is repeated each time the multi-media system 100 refreshes the input image 102.

In one or more embodiments, the CMHM 96 also performs a step 526 of receiving user feedback 528 regarding variances of the feedback image 424 from the rendered surface 303. For example, user feedback 528 may include interactions by a user with a GUI (graphical user interface) to correct the display map 444 by adjusting its layout or by adding display devices 301 that were not found by the CMHM 96. In this case, the CMHM 96 would incorporate the user feedback 528 into steps 522 and 524. In one or more embodiments, the CMHM 96 also would update the training display map 410 in response to the user feedback 528.

As an example of the method of operation 500, with reference to FIG. 3, at step 516 the monitors 308 would confirm that gaps 316 exist in the feedback image 424 that match the gaps in the rendered surface 303. At step 516, the monitors 308 would identify a variance 518 in case one of the gaps 316 had changed since the display map 444 was generated during discovery mode. The monitors 308 would identify a more serious variance if a portion of the feedback image 424 was displaced from a corresponding portion of the rendered surface 303. For example, if a portion of the rendered surface 303, which should be displayed at the lower left device 320 in FIG. 3, was instead displayed upside down at the upper right device 322. Then, by modifying the first set of rules 456 in real-time, the CMHM 96 would determine that the image frame 408 that had been sent to the VN 304 corresponding to the upper right device 322 should instead be inverted and sent to the VN 304 corresponding to the lower left device 320.

Figure 6:
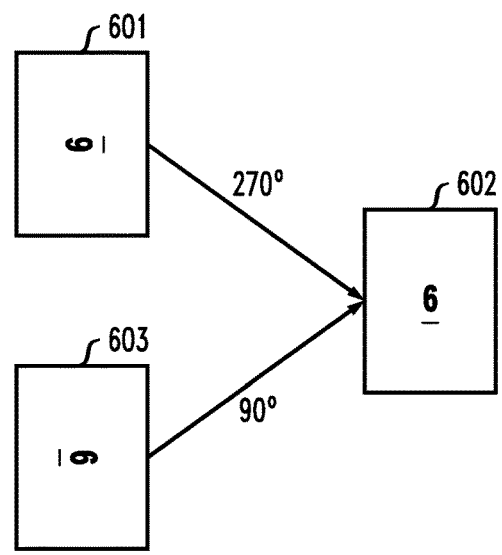
FIG. 6 depicts a re-orientation of content within the multi-head display system of FIG. 3.

As another example, referring to FIG. 6, a display device shows its rendered content in a wrong way during discovery mode (in this example, the display was not rotated). The CMHM 96 detects that the rendered content is not correctly rotated, and updates the first set of rules 456 to provide the correct rotation. The correction is performed by rotating the appropriate render frame (601 to 602 or 603 to 602).

Figure 7:
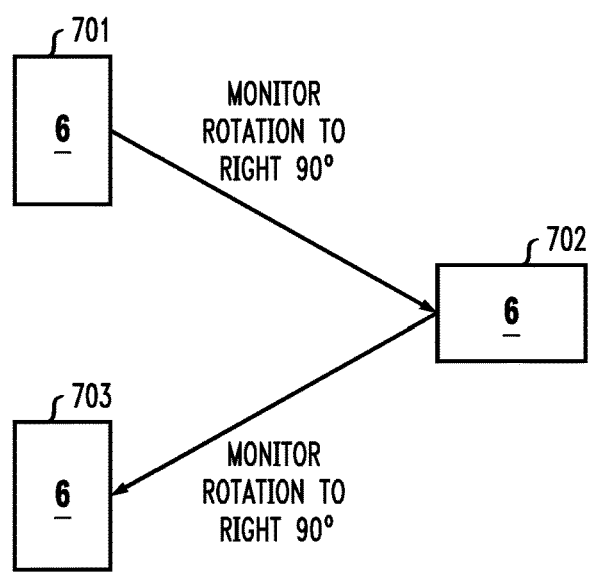
FIG. 7 depicts a re-orientation of a display device within the multi-head display system of FIG. 3.

FIG. 7 shows another example, but during operation mode, in which a display device could be rotated 90 degrees from vertical orientation 701 to horizontal orientation 702, then rotated a further 90 degrees to inverted vertical orientation 703. The CMHM 96 would update the display map 444 and the first set of rules 456 in response to each variance of the display orientation parameter, so that a numeral "6" displayed at the display device would remain right side up throughout the movement of the display device. In particular, the first set of rules 456 would be updated so that the render frame for the numeral "6" was rotated 90 degrees to the left with each rightward rotation of the display device.

Figure 8:
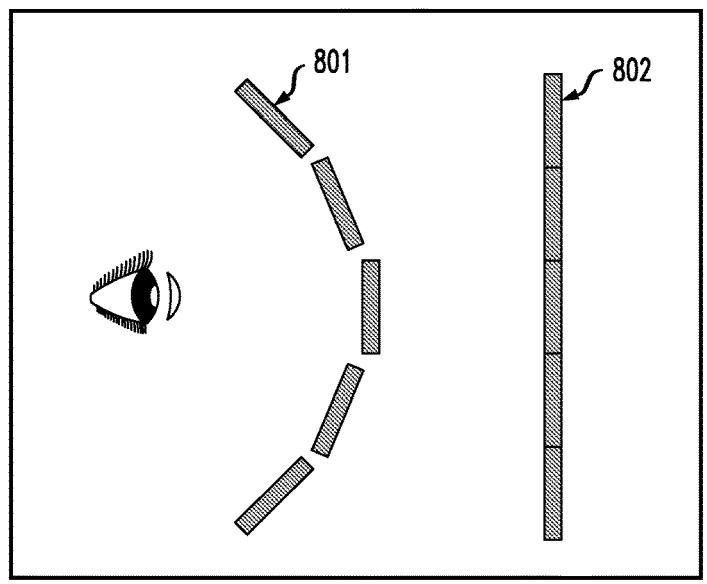
FIG. 8 depicts a re-configuration of the multi-head display system of FIG. 3.

As another example during operation mode, shown in FIG. 8, the configuration of a multi-head display could be changed from an arc 801 to a flat plane 802. The CMHM 96 would update the first set of rules 456 to correct geometric distortion so that the feedback image 424 as seen by the CNs 306 would continue to match the rendered surface 303 as generated by the CMHM 96.

Figure 9:
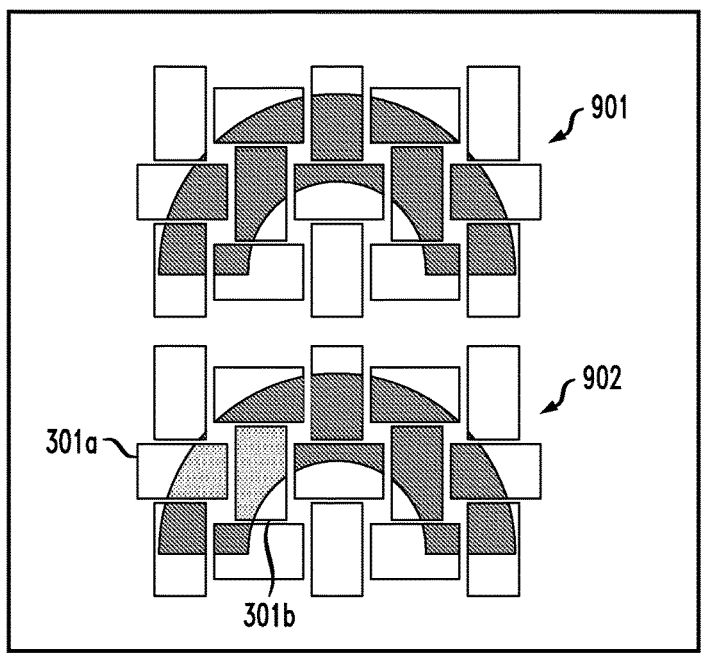
FIG. 9 depicts a malfunction of the multi-head display system of FIG. 3.

FIG. 9 shows another example during operation mode, in which two display devices 301a, 301b are functioning properly at time 901 then start to malfunction at time 902. In this case, the CMHM 96 perceives the variance between the current content of the rendered surface 303 and the current content of the feedback image 424. In the example, the malfunction consists in a difference of the brightness and contrast. The CMHM 96 compensates the malfunction by adjusting values of the parameters (brightness and contrast) that characterize the display devices 301a, 301b, until a visual uniformity is achieved across the feedback image 424 (i.e. optimal values are set for all VNs 304). In one or more embodiments, the CMHM 96 also performs a step of alerting an administrative user to take corrective action regarding the malfunction.

Other examples of variances: wrong bezels and gaps compensation (crops), wrong distortion, and any other issue regarding the parameters that were inferred during the discovery mode method 400.

Given the discussion thus far, and with reference to the drawing Figures, it will be appreciated that, in general terms, an exemplary computer-implemented method 400, according to an aspect of the invention, includes a step 446 of generating a clipped image 448 by applying a display map 444 to a feedback image 424 of a plurality of display devices 301 that display a set of training frames 408. The exemplary method also includes a step 454 of learning a first set of rules 456 that transform the clipped image 448 to match the set of training frames 408 and a step 502 of generating a rendered surface 303 by applying the display map 444 to an input image 102. Additionally, the exemplary method includes a step 504 of generating a set of render frames 506 by applying the first set of rules 456 to the rendered surface 303 and a step 508 of sending the set of render frames 506 to be displayed by the plurality of display devices 301.

In one or more embodiments, the exemplary method also includes a step 411 of sending the set of training frames 408 to be displayed by the plurality of display devices 301; a step 422 of composing the feedback image 424 of the plurality of display devices 301; a step 438 of extracting a set of polygons 440 from the feedback image 424; and a step 442 of learning the display map 444 from the feedback image 424, the set of polygons 440, and the set of training frames 408.

In one or more embodiments, the exemplary method also includes a step 406 of generating the training frames 408 from a training image 409 based on a training display map 410.

In one or more embodiments, the exemplary method also includes a step 516 of identifying at least one variance 518 between the rendered surface 303 and a feedback image 424 of the set of render frames 506 that are displayed at the plurality of display devices 301; and a step 524 of updating the display map 444 and the first set of rules 456 in response to the at least one variance.

For example, in one or more embodiments identifying the at least one variance includes a step 526 of receiving user feedback 528 regarding the display map 444.

In one or more embodiments, the display map 444 includes gaps 316 between the plurality of display devices 301. In one or more embodiments, the display map 444 includes pixel resolutions of the plurality of display devices 301.

Other embodiments of the invention provide a non-transitory computer readable medium embodying computer executable instructions, which when executed by a computer cause the computer to facilitate any of the methods above discussed. Yet other embodiments provide an apparatus that includes a memory embodying computer executable instructions and at least one processor, coupled to the memory, and operative by the computer executable instructions to facilitate any of the methods above discussed.

Figure 10:
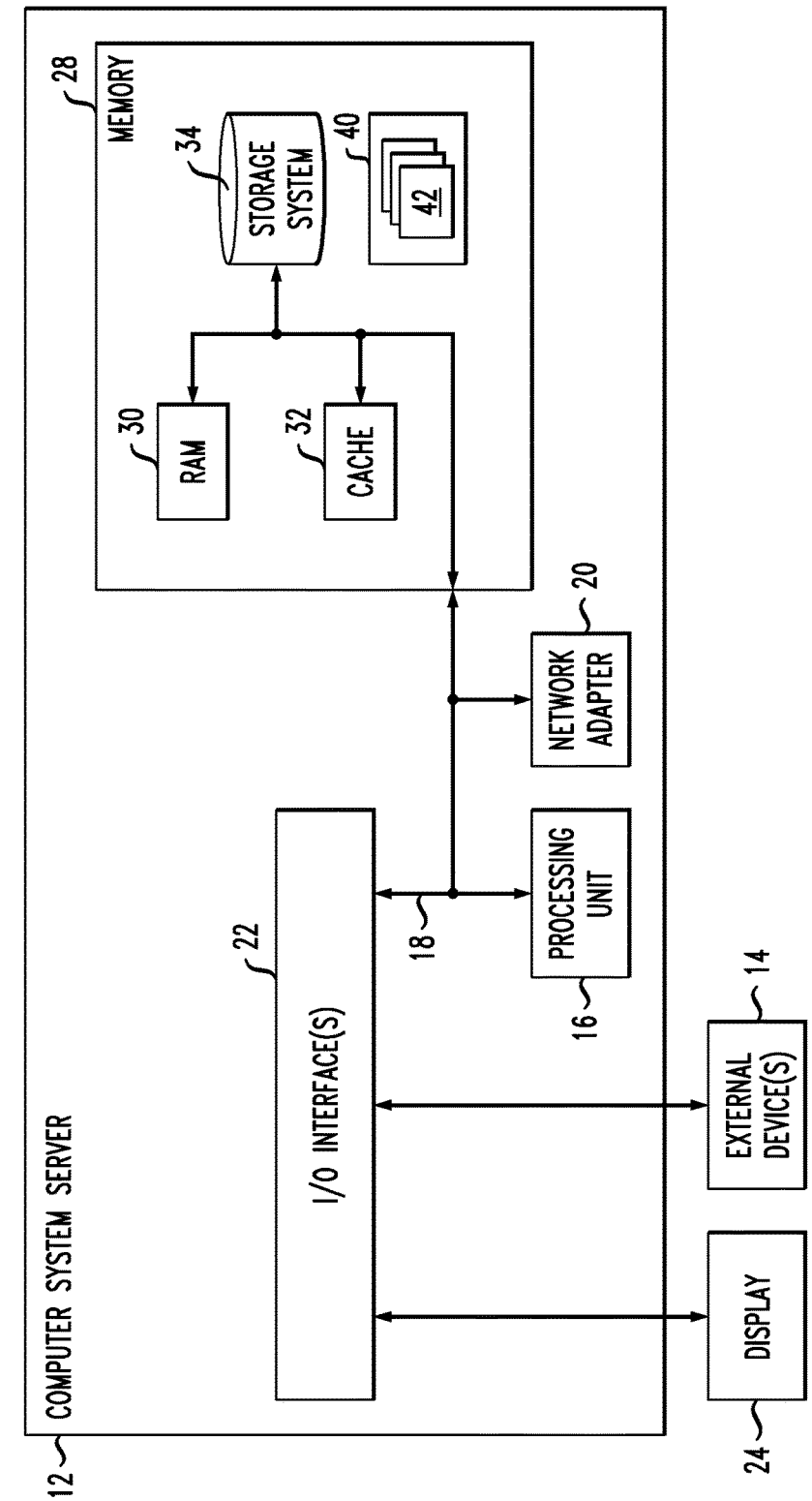
FIG. 10 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to facilitate exemplary method steps. FIG. 10 depicts a computer system that may be useful in implementing one or more aspects and/or elements of the invention, also representative of a cloud computing node according to an embodiment of the present invention. Referring now to FIG. 10, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A non-transitory computer readable medium embodying computer executable instructions which when executed by a computer cause the computer to facilitate the method of:
   generating a clipped image by applying a display map to a feedback image of a plurality of display devices that display a set of training frames, wherein the display map includes positions of the plurality of display devices within the feedback image and the clipped image includes only those portions of the feedback image that correspond to the display map;
   learning, by comparing the clipped image to the set of training frames, a first set of rules that transform the clipped image to match the set of training frames, wherein the first set of rules is implemented through a neural network that implicitly accounts for pixel resolutions of the plurality of display devices;
   generating a rendered surface by applying the display map to an input image, wherein the rendered surface includes only those portions of the input image that correspond to the display map;
   generating a set of render frames by applying the first set of rules to the rendered surface; and
   sending the set of render frames to be displayed as the rendered surface by the plurality of display devices.

2. The computer readable medium of claim 1 further embodying computer executable instructions that cause the computer to further perform:
   sending the set of training frames to be displayed by the plurality of display devices;
   composing the feedback image of the plurality of display devices;
   extracting a set of polygons from the feedback image; and
   learning the display map from the feedback image, the set of polygons, and the set of training frames.

3. The computer readable medium of claim 1 further embodying computer executable instructions that cause the computer to further perform:
   generating the training frames from a training image based on a training display map.

4. The computer readable medium of claim 1 further embodying computer executable instructions that cause the computer to further perform:
   identifying at least one variance between the rendered surface and a feedback image of the set of render frames that are displayed at the plurality of display devices; and
   updating the display map and the first set of rules in response to the at least one variance.

5. The computer readable medium of claim 1 wherein identifying the at least one variance includes receiving user feedback regarding the display map.

6. The computer readable medium of claim 1 wherein the display map includes gaps between the plurality of display devices.

7. The computer readable medium of claim 1 wherein the display map includes pixel resolutions of the plurality of display devices.

8. An apparatus comprising:
   a memory embodying computer executable instructions; and
   at least one processor, coupled to the memory, and operative by the computer executable instructions to facilitate:
   generating a clipped image by applying a display map to a feedback image of a plurality of display devices that display a set of training frames, wherein the display map includes positions of the plurality of display devices within the feedback image and the clipped image includes only those portions of the feedback image that correspond to the display map;
   learning, by comparing the clipped image to the set of training frames, a first set of rules that transform the clipped image to match the set of training frames, wherein the first set of rules is implemented through a neural network that implicitly accounts for pixel resolutions of the plurality of display devices;
   generating a rendered surface by applying the display map to an input image, wherein the rendered surface includes only those portions of the input image that correspond to the display map;
   generating a set of render frames by applying the first set of rules to the rendered surface; and
   sending the set of render frames to be displayed as the rendered surface by the plurality of display devices.

9. The apparatus of claim 8 wherein the processor is further operative to facilitate:
   sending the set of training frames to be displayed by the plurality of display devices;
   composing the feedback image of the plurality of display devices;
   extracting a set of polygons from the feedback image; and
   learning the display map from the feedback image, the set of polygons, and the set of training frames.

10. The apparatus of claim 8 wherein the processor is further operative to facilitate:
    generating the training frames from a training image based on a training display map.

11. The apparatus of claim 8 wherein the processor is further operative to facilitate:
    identifying at least one variance between the rendered surface and a feedback image of the set of render frames that are displayed at the plurality of display devices; and
    updating the display map and the first set of rules in response to the at least one variance.

12. The apparatus of claim 8 wherein identifying the at least one variance includes receiving user feedback regarding the display map.

13. The apparatus of claim 8 wherein the display map includes gaps between the plurality of display devices.

* * * * *